(No Model.)
R. F. BRUMFIELD & J. E. MURPHY.
HAND DROPPER.
No. 355,377. Patented Jan. 4, 1887.
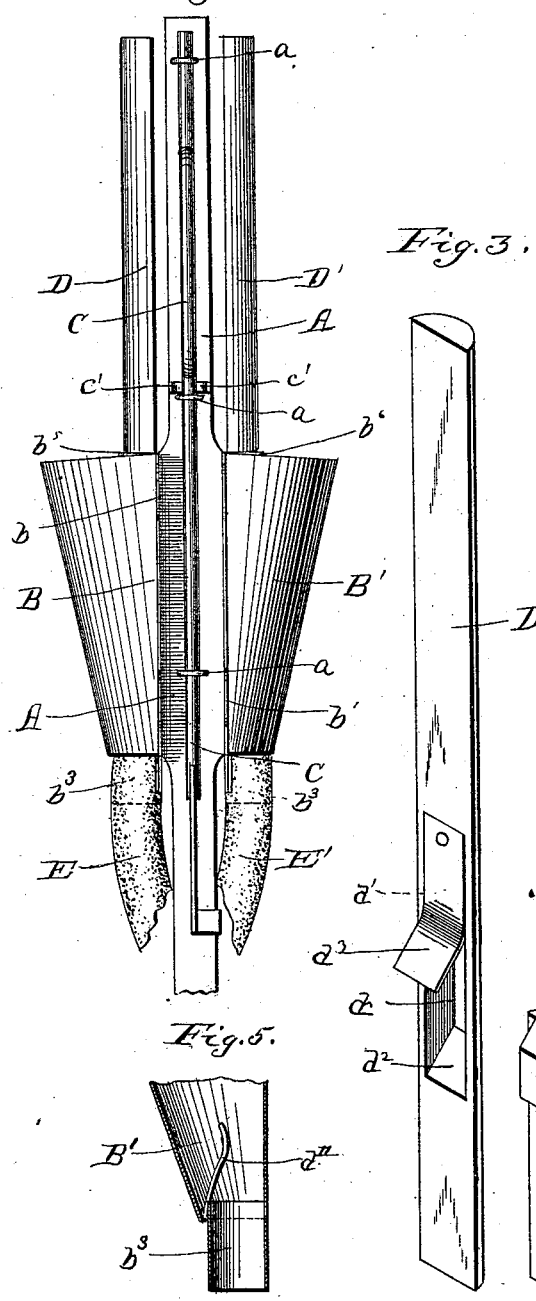
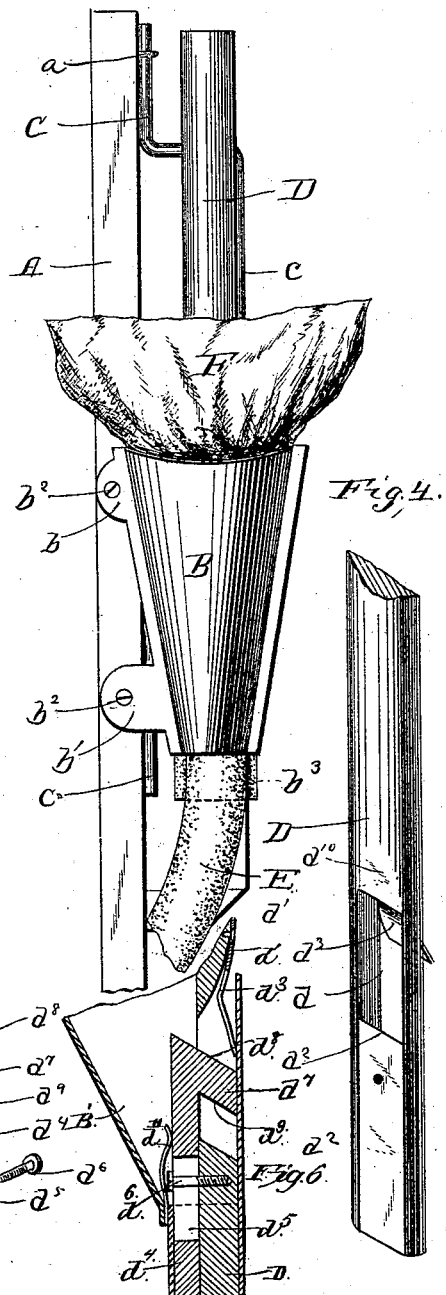
Witnesses
Chas. L. Taylor,
E. L. Siggers
Inventors
Robert F. Brumfield
Joshua E. Murphy
By their Attorneys

UNITED STATES PATENT OFFICE.

ROBERT FOSTER BRUMFIELD AND JOSHUA ELDER MURPHY, OF HOPKINSVILLE, KENTUCKY.

HAND-DROPPER.

SPECIFICATION forming part of Letters Patent No. 355,377, dated January 4, 1887.

Application filed July 26, 1886. Serial No. 209,130. (No model.)

*To all whom it may concern:*

Be it known that we, ROBERT FOSTER BRUMFIELD and JOSHUA ELDER MURPHY, citizens of the United States, residing at Hopkinsville, in the county of Christian and State of Kentucky, have invented a new and useful Improvement in Hand-Droppers, of which the following is a specification.

The object of our invention is to produce a hand-dropper for seeds and fertilizers; and our invention consists in the peculiar and novel features of construction and arrangement, as hereinafter described and claimed.

In order that our invention may be fully understood, we will proceed to describe it with reference to the accompanying drawings, in which—

Figure 1 is a front elevation of our improved corn and fertilizer dropper. Fig. 2 is a side elevation of the same. Fig. 3 illustrates a detail view of the dropping bar and slide. Fig. 4 is a detail view of the dropping-bar looking from the side opposite to Fig. 3. Fig. 5 is a detached sectional view of the lower end of the hopper. Fig. 6 is a vertical sectional view through the lower part of one of the hoppers and the reciprocating bar working therein.

In the said drawings, A designates the main supporting-staff of the dropper, and B B' designate, respectively, the seed and fertilizer hoppers. Each hopper is made flaring or tapering, as shown, and they have flat sides, which are attached to opposite sides of the staff A by means of screws $b^2$, or similar devices, extending through lugs $b\ b'$ on said hoppers B B', respectively.

C designates an operating-rod, which extends longitudinally of the staff A and works through loops or staples $a$ thereon. This rod C is formed with a U-shaped bend, $c$, to receive a handle. At the lower terminus of the bend $c$ are secured two outwardly-extending arms, $c'$, which are attached to the upper ends of the dropping-bars D D', which work, respectively, in the hoppers B B'.

E E' designate the tubes which connect, respectively, with the lower reduced ends, $b^3$, of the hoppers B B', and convey the seed and fertilizer to the ground, while F designates the bags which connect with the upper ends of the hoppers B B', respectively, and feed the seed and fertilizer to said hoppers.

The dropping-bars D D' are each formed half-round, as shown, to work properly through the similarly-shaped reduced ends $b^3\ b^3$, and also through semicircular guides $b^5\ b^6$ in the upper ends of the hoppers B B', respectively. At its lower portion each of these bars has an elongated opening, $d$, the upper and lower ends, $d'\ d^2$, of which are inclined, as shown. A bent spring-plate, $d^3$, is set in the upper end, $d^2$, of each of the slots $d$, the lower ends of said springs extending inward against the flat sides of the hoppers B B', as shown.

$d^4$ designates a block having at its lower portion an elongated slot, $d^5$, to receive a set-screw, $d^6$, upon the outer side of each bar D D', as shown, and at its upper end said block is formed with a lateral projection, $d^7$, the upper and lower margins of which are beveled off downwardly, as shown at $d^8\ d^9$, for a purpose to be described. Immediately above the slot $d$, on the outer or curved side of each of the bars D, is formed a flattened surface, $d^{10}$, and the purpose of this flattened surface is to afford a slight fall for an upwardly-extending spring, $d^{11}$, which is secured in the bottom of the fertilizer-hopper B', as shown.

The upper ends of the bags are connected to straps which pass around the operator's neck, so that said bags and the entire device are properly supported upon the person of the operator. When the dropping-bars are depressed, a combined charge of seed and fertilizer is deposited in the ground. The oblique sides of the hoppers B B' serve to direct the seed and fertilizer properly to the apertures or "cups" $d$ of the dropping-bars, while the spring $d^{11}$ prevents any overloading of said cups, and the springs $d^3$ serve to force the charge out of said cups when the bar is depressed. The inclined bottoms of the apertures or cups insure the ready entrance of the charges into and their ready discharge from said apertures or cups.

The entire device is simple and durable in construction, and operates with the utmost ease. If desired, the handle of the bar may be adjustably secured thereto to adapt the machine for use by persons of different heights.

The block $d^4$ is secured to and moves with the vertically-movable bar D, and the tongue or lip $d^8$ of the said slide fits or passes into the slot $d$ on the said bar, so as to form or provide a space between the beveled side $d^8$ of the tongue and the upper beveled side of the slot $d$, which forms a cup or receptacle in the bar D for the charge of seed or fertilizer that is to be dropped, the bevels of the tongues and upper end of the slot in the said bar inclining in reverse directions. As this block is connected to the vertically-movable bar by a screw, $d^6$, that passes through a slot, $d^5$, the block can be adjusted or moved on the bar independently thereof, to vary, increase, or diminish the size of the opening or cup between the tongue $d^8$ and the upper beveled side of the slot $d$, so that the charge of seed or fertilizer to be planted can be very readily regulated and controlled. The spring $d^3$, that is rigidly affixed to the reciprocating bar, has its lower end inclined or bent at an obtuse angle to the main or body portion thereof, and this angular portion of the spring projects or extends into the seed opening or cup of the bar, so as to exert a slight pressure on the contents of the cup, the lower terminal end of the said spring being arranged in close proximity to and out of contact with the upper beveled side, $d^8$, of the adjustable block, so as to nearly close one side of the seed cup or opening. The free outer end of the said spring impinges and rides against the inner wall of the hopper, and the contents of the cup or opening in the bar is compressed slightly between the angular portion of the spring and the beveled side $d^8$ of the adjustable block; and when the bar and its attached spring emerge from the lower open end of the hopper the free end of the said spring is released from contact with the hopper, so that it springs outwardly toward the staff of the implement, thereby releasing the pressure on the contents of the cup or opening and enlarging the space between the free end of the spring and the beveled side $d^8$ of the block, to thereby permit the charge or contents of the cup or opening to flow freely down the beveled side $d^8$ of the block into the conducting-spout E or E′, as will be very readily understood.

The handle is carried by the operating-rod C, and it is detachably secured by means of screws or other devices to the vertically-movable bars D, so that both of the said bars can be operated simultaneously with the rod; or only one of the bars can be connected with the rod, to be operated thereby.

Having thus described our invention, what we claim as new therein, and desire to secure by Letters Patent, is—

1. In a hand corn-dropper, the combination of a vertical staff, a hopper carried thereby and having a contracted discharge end, $b^3$, a vertically-reciprocating bar working in the hopper and having a longitudinal slot provided with an inclined upper edge, a block affixed to the bar and having a beveled tongue fitting into the slot thereof to form a seed-cup between the beveled ends of the slot and tongue, said bevels of the slot and tongue inclining in reverse directions, and a spring secured at one end to the bar and bearing at its opposite end against the hopper, the said spring being bent near its free end and projecting into the seed-cup to discharge the contents thereof, substantially as described, for the purpose set forth.

2. In a hand corn-planter, the combination of a staff, a hopper affixed thereto and having a contracted lower end, $b^3$, a slotted vertical bar reciprocating in the hopper, a block adjustably secured to the bar and having a tongue fitting in the slot thereof to form a seed-cup, a spring secured to the bar and projecting into the seed-cup, and an inclined spring secured at its lower end to the hopper and bearing against the bar at its upper end, substantially as described, for the purpose set forth.

3. In a hand corn-planter, the combination of a staff, the hoppers affixed thereto on opposite sides and each having the contracted lower end, the vertical operating-rod C, working in guides on the staff, vertically-reciprocating bars D, working in the hoppers and connected with the operating-rod for simultaneous operation and each provided with a seed cup or opening, the adjustable blocks secured on the bars and each having the projecting tongue, the springs carried by the bars and entering the seed-cups thereof, and the inclined springs affixed to the hoppers and bearing at their free ends against the reciprocating bars, substantially as described, for the purpose set forth.

In testimony that we claim the foregoing as our own we have hereto affixed our signatures in presence of two witnesses.

ROBERT FOSTER BRUMFIELD.
JOSHUA ELDER MURPHY.

Witnesses:
H. W. BREATHITT,
D. A. TANDY.